Nov. 27, 1934.  J. F. BALL ET AL  1,982,190
ELECTRIC HEATER
Filed Dec. 18, 1933   2 Sheets-Sheet 1

INVENTORS.
Joseph F. Ball,
BY Hal McKinstry Quirey.
Townsend and Loftus
ATTORNEYS.

Nov. 27, 1934.   J. F. BALL ET AL   1,982,190
ELECTRIC HEATER
Filed Dec. 18, 1933   2 Sheets-Sheet 2
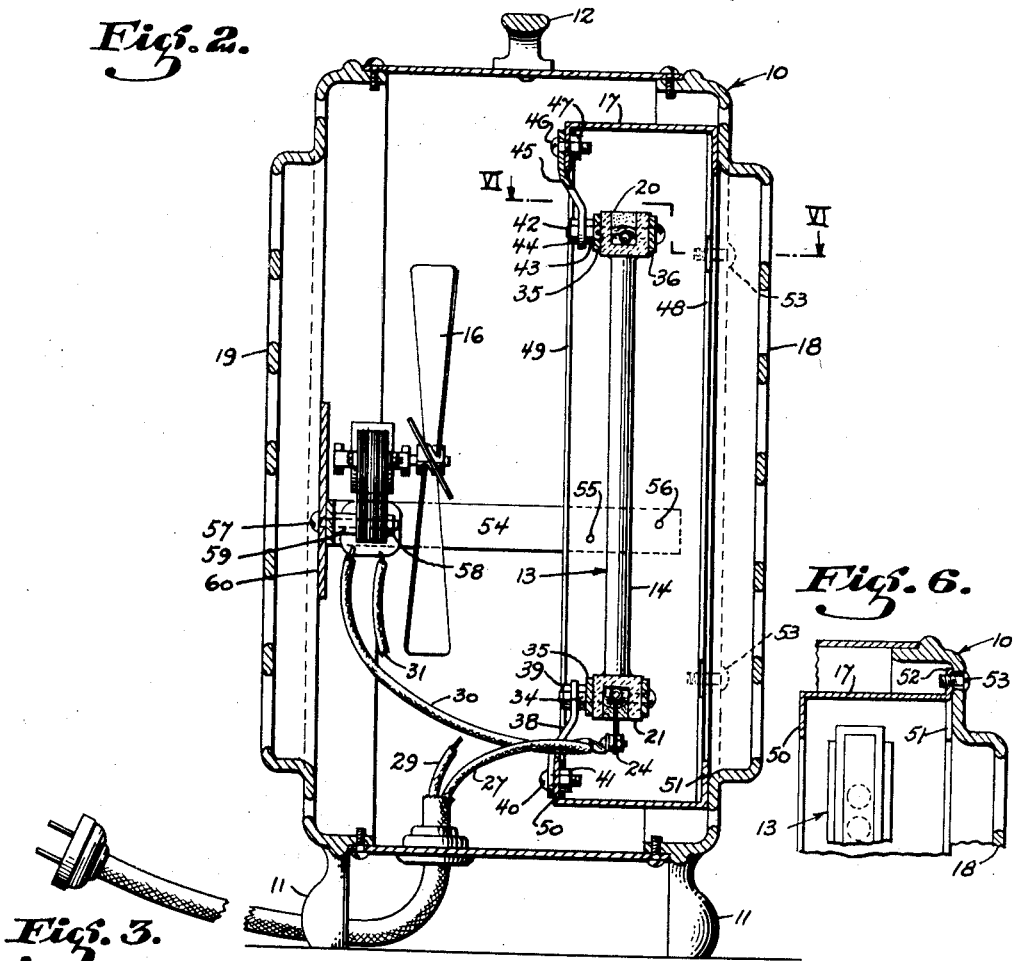
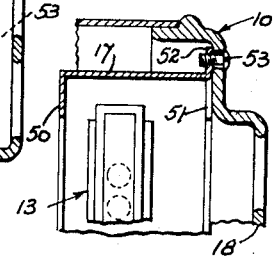
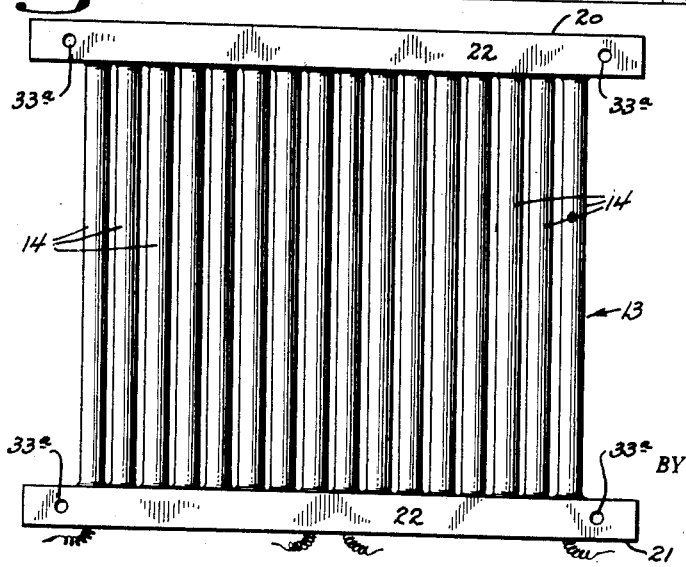
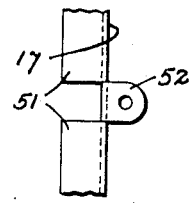
INVENTORS.
Joseph F. Ball,
Hal McKinstry Quirey.
BY Townsend & Loftus.
ATTORNEYS.

Patented Nov. 27, 1934

1,982,190

UNITED STATES PATENT OFFICE 1,982,190

ELECTRIC HEATER

Joseph F. Ball and Hal McKinstry Quirey, San Francisco, Calif.

Application December 18, 1933, Serial No. 702,961

3 Claims. (Cl. 219—39)

This invention relates to improvements in electric heaters.

An object of the invention is to provide an electric heater wherein the heating element is easily mountable and demountable.

Another object of the invention is to provide a heating element capable of developing and storing up heat and from which the heat may be extracted, and which is easily and economically made.

Another object of the invention is the provision of a series of spaced and substantially parallel straight, hollow members for storing up and giving off heat.

Still another object of the invention is the provision of means to remove and disperse the stored up heat.

For an explanation of our invention, reference is made to the accompanying drawings, whereon—

Fig. 2 is a cross-section on the line II—II of Fig. 1;

Figure 1:
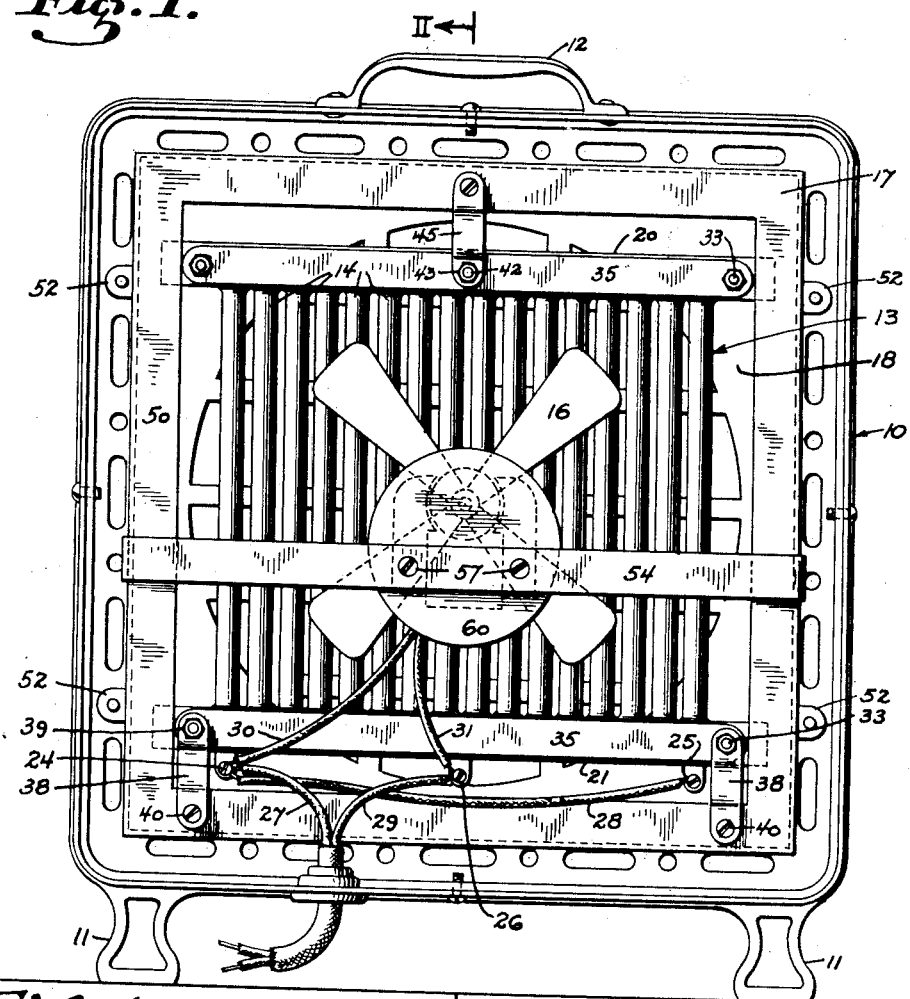
Fig. 1 is a rear view with the rear guard plate removed.
Figure 4:
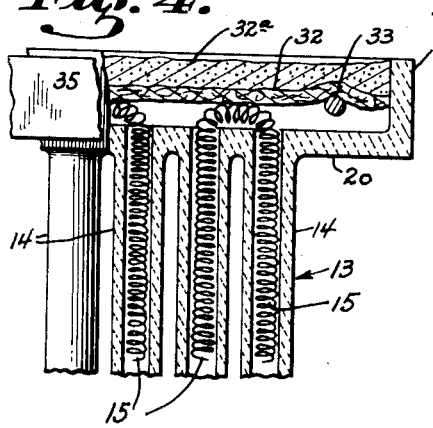
Figure 5:
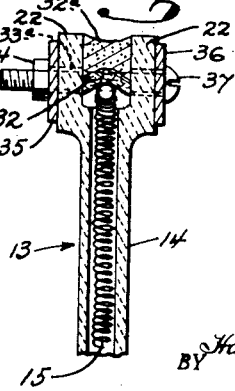

Fig. 3 is an elevation of the heating element;

Fig. 4 is a longitudinal section therethrough;

Fig. 5 is a cross-section therethrough;

Fig. 6 is a cross-section of a detail on the line VI—VI of Fig. 2; and

Fig. 7 is an elevation of a detail showing the method of mounting the inner to the outer casing.

We provide a casing 10 which may have supporting legs 11 and a handle 12, within which we mount a series of parallel heat-supplying members 13, which we prefer to be tubes 14 of heat-resisting and heat-storing material such, for example, as porcelain or other equivalent refractory substance, within which are electrical coils 15 for the development of heat.

We generally prefer to provide within the casing an electric fan 16 to blow air forwardly past the heat-storing tubes, and we mount the heating element within what may be described as an inner casing 17 to prevent the outer casing from becoming too hot. The casing is provided at the front and rear faces thereof with reticulated guards 18, 19, to prevent ingress of any solid object within the casing and to permit air to pass into the rear of the casing past the heating element and out at the front of the casing.

That part of the heating element which holds the electrical heating coils comprises a series of tubes which we prefer to mold in one integral piece of porcelain, these tubes 14 being preferably parallel and terminating in similar common headers 20 and 21, which are of open, trough-like formation having preferably side walls 22 and end walls 23. The electrical heating coils 15 may comprise one long coil or more than one attached together, and are inserted alternately upwardly and downwardly in adjacent tubes, and in passing from tube to tube lie in the open troughs of the headers. The ends of the combined length of heating coils terminate in electric terminals 24, 25, to which the electric feed lines are connected, and in some instances an additional terminal 26 may be provided when it is desired to run the two halves of the combined length of electrical heating coil in parallel, this of course depending upon the resistance of the whole length of coil and the voltage available. In the embodiment illustrated, the lead wire 27 is connected to the terminal 24 and also by means of the connection 28 to the terminal 25, the other lead wire 29 being connected to the terminal 26; and the fan leads 30 and 31 are connected to the terminals 24 and 26, respectively.

After the length of coil has been strung through the tubes and headers and placed in proper relation therewith, a length of asbestos rope or tape 32 is laid thereover, and then plastic material 32a, for example porcelain, is placed thereon to fill up or nearly fill up the trough. As a result we have a long length of electric heating coil passing back and forth and completely enclosed within refractory material, whereby all the heat developed by the coils is absorbed or stored up by such refractory material to be given off as required.

Fastening members, such as bolts 33 and nuts 34 thereon, hold metal plates 35 and 36 against the upper and lower headers to reinforce the same, the nuts 34 being turned to the proper tightness to maintain this assembly between the nut 34 and the head 37 of the bolt. Holes 33a are provided in the porcelain to accommodate the bolts 33. It is, of course, understood that the asbestos tape 32 and the plastic material 32a, are put in position after positioning the bolts 33. We prefer to mount or suspend the completed heating element at the least number of points consistent with secure mounting to permit possible distortion of the porcelain framework which may occur as a result of temperature changes. Bent metal plates 38, one at each end of the lower header, are held against the nuts 34, each by a nut 39 on the bolt 33, the lower ends of the plates 38 being held on the rear wall of the inner casing by bolts 40 and nuts 41.

Before the upper plate 35 is positioned on the heating element, a flat-headed screw 42 is inserted through an opening in said plate formed to accommodate and retain the same in position with the flat head of the screw against the outside of the upper header 20. Two nuts 43 and 44 are provided to retain the bent supporting plate 45 in position between them, the upper end of this bent plate being held by bolt 46 to the upper outside wall of the inner casing, a nut 47 retaining the bolt 46 in position. It will thus be seen that a slight amount of warping of the heat element is permitted to avoid cracking or breaking thereof.

The member 17 on which the heating element is mounted and within which it is positioned is preferably a rectangular casing having a front opening 48 and a rear opening 49 almost as large as the corresponding faces in which they appear. This casing is preferably made of sheet metal having a flange 50 all around to form the rearward opening and a flange 51 all around to form the forward opening. A narrow lug 52 is bent out of the flange 51 (one at each side), as will be seen on Fig. 7, and a screw 53 holds this lug to the casing wall 10.

The fan is mounted on a U-shaped metal strap 54, the legs of which are perforated as at 55 and 56 to permit riveting the straps to the outside wall of the inner casing, a bolt or bolts 57 passing through the motor body and being held in position by a nut or nuts 58. A sleeve 59 on each bolt suitably spaces the motor. If desired, a plate 60 may be interposed between the heads of the bolts and the U-shaped strap to hide or partially hide the motor.

We prefer to coat the refractory material with a graphite paint so that there will be no white surfaces to become dirty and to aid in the distribution of the heat. We may also surround the tubes 14 with tubes or casings of various materials, the material chosen depending on the effect desired; and when such tubes are used, the graphite paint coating may or may not be omitted.

By a proper choice of the physical values of the different elements, we find that air entering our heater at 60° F. can be made to emerge at 210° F. with no tubes surrounding the elements 14. When they are surrounded by brass, however, such air will emerge at 180° F.; while it will emerge at 140° F. when surrounded with aluminum. The air emerges at a still different temperature when the surrounding tubes are glass, and if desired, the tubes 14 themselves can be made of glass of high melting-point.

The heating element, as shown in Fig. 3, may be a unitary integral element or it may be composed of various parts fastened together, as may be convenient.

While we have referred to various specific details in describing our invention, yet it is to be understood that various changes may be made without departing from the spirit of the invention the scope of which is defined in the appended claims.

Having described our invention, what we claim is—

1. An electric heater comprising an outer casing, a fan within said casing, an inner casing within said outer casing and in front of said fan, a heating element within said inner casing and comprising spaced tubes of refractory material, a header of refractory material connecting said tubes at one end thereof, a header of refractory material connecting said tubes at the other end thereof, and resistance coils strung through said tubes and headers and being substantially completely enclosed thereby, said outer casing having openings at the rear and front thereof to permit air to pass from the rear to the front of said outer casing between said tubes and to permit air ventilation between said casings.

2. An electric heater comprising an outer casing, a fan within said casing, an inner casing within said outer casing and in front of said fan, a heating element within said inner casing and comprising spaced porcelain tubes, a porcelain header connecting said tubes at one end thereof, a porcelain header connecting said tubes at the other end thereof, and resistance coils strung through said tubes and headers and being substantially completely enclosed thereby, said outer casing having openings at the rear and front thereof to permit air to pass from the rear to the front of said outer casing between said tubes and to permit air ventilation between said casings.

3. An electric heater comprising an outer casing, a fan within said casing, an inner casing within said outer casing and in front of said fan, a heating element within said inner casing and comprising spaced tubes of refractory material, a header of refractory material connecting said tubes at one end thereof, a header of refractory material connecting said tubes at the other end thereof, resistance coils strung through said tubes and headers and being substantially completely enclosed thereby, said outer casing having openings at the rear and front thereof to permit air to pass from the rear to the front of said outer casing between said tubes and to permit air ventilation between said casings, and material around said tubes to modify their heating effect.

JOSEPH F. BALL.
HAL McKINSTRY QUIREY.